(12) United States Patent
Salmon

(10) Patent No.: US 8,371,945 B2
(45) Date of Patent: Feb. 12, 2013

(54) GAMING MACHINE AND A NETWORK OF GAMING MACHINES

(75) Inventor: Christian James Salmon, Maidstone (AU)

(73) Assignee: Aristocrat Technologies Australia Pty Limited (AU)

( * ) Notice: Subject to any disclaimer, the term of this patent is extended or adjusted under 35 U.S.C. 154(b) by 924 days.

(21) Appl. No.: 12/336,236

(22) Filed: Dec. 16, 2008

(65) Prior Publication Data

US 2009/0179597 A1   Jul. 16, 2009

(30) Foreign Application Priority Data

Dec. 18, 2007   (AU) ................................ 2007906935

(51) Int. Cl.
*A63F 9/24* (2006.01)
*A63F 13/00* (2006.01)
*G06F 17/00* (2006.01)
*G06F 19/00* (2011.01)

(52) U.S. Cl. ........................ 463/46; 362/556; 362/583

(58) Field of Classification Search .................. 463/46; 362/556, 559, 583, 600
See application file for complete search history.

(56) References Cited

U.S. PATENT DOCUMENTS 3,603,665 A * 9/1971 Goldmark et al. ............ 385/115
3,644,725 A * 2/1972 Lochridge, Jr. ................ 362/556
4,097,917 A * 6/1978 McCaslin ...................... 362/565
4,165,919 A * 8/1979 Little .............................. 359/234
5,040,320 A * 8/1991 Reidinger ........................ 40/570
5,160,565 A * 11/1992 Chazalon et al. ............. 156/242
5,401,025 A   3/1995 Smith, III et al.

(Continued)

FOREIGN PATENT DOCUMENTS

BE   899865      12/1984
CA   2311609     2/2001

(Continued)

OTHER PUBLICATIONS

Tri North Lighting (publication by Tri North Lighting, Inc. "Super Vision End Glow Fiber Optic Cable" available online at http://www.trinorthlighting.com/End%20Glow%20fiber%20optic%20cable.htm as of Feb. 9, 2006.*

(Continued)

*Primary Examiner* — N Drew Richards
*Assistant Examiner* — Grant Withers
(74) *Attorney, Agent, or Firm* — McAndrews, Held & Malloy, Ltd.

(57) ABSTRACT

The present invention relates to a gaming machine having a light source and one or ideally a series of lighting positions that are illuminated, via optical pathways that are suitably in the form of optical fibers that transmit light from the light source to the or each lighting position. The light source may have a light filter that operably controls the color and intensity of light illuminating from the lighting positions depending on the outcomes of the game being played. The present invention also relates to a network of the gaming machines and a centralized light source, wherein optical pathways, suitably in the form of optical fibers, transmit light from the light source to the light positions of two or more gaming machines. The network may also include a controller to control illumination of the lighting positions, including color of the light and intensity of the light based on data received from an outcome determiner of one or more of the machines of the network.

31 Claims, 4 Drawing Sheets

U.S. PATENT DOCUMENTS

| | | | |
|---|---|---|---|
| 5,430,825 A * | 7/1995 | Leaman et al. | 385/147 |
| 5,799,124 A * | 8/1998 | Zorn et al. | 385/125 |
| 5,800,292 A | 9/1998 | Brace | |
| 5,931,731 A | 8/1999 | Chwalisz | |
| 6,003,013 A | 12/1999 | Boushy et al. | |
| 6,113,281 A * | 9/2000 | Davis | 385/73 |
| 6,146,276 A | 11/2000 | Okuniewicz | |
| 6,176,185 B1 | 1/2001 | Charlier et al. | |
| 6,234,656 B1 * | 5/2001 | Hosseini et al. | 362/556 |
| 6,234,657 B1 * | 5/2001 | Shih | 362/559 |
| 6,301,418 B1 * | 10/2001 | Freier et al. | 385/123 |
| 6,517,437 B1 | 2/2003 | Wells et al. | |
| 6,830,366 B2 * | 12/2004 | Irie | 362/583 |
| 7,344,276 B2 * | 3/2008 | Chornenky | 362/249.16 |
| 7,352,951 B2 * | 4/2008 | Gotfried | 385/147 |
| 7,438,641 B2 * | 10/2008 | Hedrick | 463/30 |
| 7,775,888 B2 * | 8/2010 | Wudtke | 463/46 |
| 2001/0003711 A1 | 6/2001 | Coyer | |
| 2002/0006828 A1 * | 1/2002 | Gerding | 463/46 |
| 2002/0097978 A1 | 7/2002 | Lowry et al. | |
| 2004/0090155 A1 | 5/2004 | Nagano | |
| 2004/0123500 A1 | 7/2004 | Lau | |
| 2004/0166927 A1 | 8/2004 | Okada | |
| 2004/0209669 A1 | 10/2004 | Emori et al. | |
| 2004/0246745 A1 * | 12/2004 | Morris et al. | 362/583 |
| 2005/0057945 A1 * | 3/2005 | Pipo et al. | 362/559 |
| 2005/0059486 A1 * | 3/2005 | Kaminkow | 463/31 |
| 2005/0064941 A1 | 3/2005 | Hedrick et al. | |
| 2005/0090311 A1 | 4/2005 | Allitt et al. | |
| 2005/0128614 A1 * | 6/2005 | Kao et al. | 359/892 |
| 2005/0255907 A1 | 11/2005 | Gauselmann et al. | |
| 2006/0135249 A1 | 6/2006 | Seelig et al. | |
| 2006/0154729 A1 * | 7/2006 | LeMay et al. | 463/42 |
| 2006/0280423 A1 * | 12/2006 | Gotfried | 385/147 |
| 2007/0010318 A1 * | 1/2007 | Rigsby et al. | 463/20 |
| 2007/0060291 A1 | 3/2007 | Cole | |
| 2007/0155511 A1 | 7/2007 | Grundstedt et al. | |
| 2007/0195276 A1 * | 8/2007 | Plut | 353/31 |
| 2007/0279929 A1 * | 12/2007 | Peng et al. | 362/556 |
| 2008/0039213 A1 * | 2/2008 | Cornell et al. | 463/46 |
| 2008/0102963 A1 * | 5/2008 | Flagg et al. | 463/46 |
| 2008/0113755 A1 * | 5/2008 | Rasmussen et al. | 463/20 |
| 2009/0054159 A1 * | 2/2009 | Gadda et al. | 463/46 |
| 2010/0105469 A1 * | 4/2010 | Hughs-Baird | 463/25 |

FOREIGN PATENT DOCUMENTS

| | | |
|---|---|---|
| CA | 2484568 | 2/2001 |
| CA | 2562360 | 11/2005 |
| CA | 2536956 | 8/2007 |
| CH | 681415 | 3/1993 |
| DE | 19539546 | 4/1997 |
| EP | 0924661 | 6/1999 |
| EP | 0961213 | 12/1999 |
| EP | 1571621 | 9/2005 |
| ES | 8609863 | 12/1986 |
| FR | 2863725 | 6/2005 |
| GB | 2101381 | 1/1983 |
| GB | 2214219 | 8/1989 |
| GB | 2239547 | 7/1991 |
| GB | 2406204 | 3/2005 |
| GB | 2414545 | 11/2005 |
| GB | 2424055 | 9/2006 |
| JP | 9103542 | 4/1997 |
| JP | 2005205040 | 8/2005 |
| JP | 2006130088 | 5/2006 |
| SE | 528882 | 3/2007 |
| WO | WO9843816 | 10/1998 |
| WO | WO2004004285 | 1/2004 |
| WO | WO2005058443 | 6/2005 |
| WO | WO2006124976 | 11/2006 |
| WO | WO2007066105 | 6/2007 |

OTHER PUBLICATIONS

Second Tri North Lighting (Second publication by Tri North Lighting, Inc. "Super Vision Fiber Optic Side Glow Cables" available online at http://www.trinorthlighting.com/Fiber%20Optic%20Cables.htm as of Feb. 8, 2006.*

* cited by examiner

GAMING MACHINE AND A NETWORK OF GAMING MACHINES

RELATED APPLICATIONS

This application claims priority to Australian Provisional Patent Application No. 2007906935, having a filing date of Dec. 18, 2007, which is incorporated herein by reference in its entirety.

FEDERALLY SPONSORED RESEARCH OR DEVELOPMENT

Not Applicable]

MICROFICHE/COPYRIGHT REFERENCE

Not Applicable]

FIELD OF THE INVENTION

The present invention relates to a gaming machine having a lighting source and a network of gaming machines connected to at least one common lighting source.

BACKGROUND OF THE INVENTION

Lighting for gaming machines has been provided in many different forms including standard incandescent globes, fluorescent globes, mercury lamps, high and low pressure sodium lamps, and high-intensity globes such as halogen lamps or metal halides. More recently, light emitting diodes (LEDs) and organic light emitting diodes (OLEDs) have been used as small individual sources of light. The light from the light sources can be used for a variety of purposes including lighting individual buttons on a player interface of a gaming machine or a light source behind a translucent film having an image on the film so as to illuminate the image. Light from the light sources may also be used to illuminate other information relating to a game being played to a player, such as the images or symbols on the reel strips of mechanical reels, or radiate light from the outer face of the machine.

BRIEF SUMMARY OF THE INVENTION

According to the present invention there is provided a gaming machine comprising:
a housing for containing at least a portion of working components of the gaming machine;
a light source that emits light; and
an optical pathway that transmits light from the light source to a lighting position so as to provide illumination at the lighting position;
wherein the lighting position is located inside or outside the housing.

An advantage of the present invention is that a single light source can be used to light a plurality of separate and, possibly remote lighting positions within or outside the housing of the gaming machine.

In an embodiment, the lighting position is one of a plurality of lighting positions each inside or outside the housing, and the gaming machine includes respective optical pathways for transmitting light from the light source to the lighting positions so as to illuminate the lighting positions. In other words, the gaming machine may include a plurality of lighting positions of which one or more may be located either inside or outside the housing and each lighting position is illuminated by light transmitted from the light source by at least one optical pathway. According to one embodiment, each lighting position is illuminated by light transmitted by only one optical pathway.

According to one embodiment, the housing includes an outer panel, the lighting position is on the outer panel, and the optical pathway is arranged to transmit light from the light source to the lighting position. The lighting position on the outer panel may be one of a plurality of lighting positions on the outer panel. Suitably, light emitted from the lighting position on the outer panels radiates away from the outer panel.

According to an embodiment, the outer panel is in the form of any one or a combination of:
one or more panels located about the periphery of a display, such as a display screen or a viewing window for mechanical reels;
one or more panels forming an upper face of a mid-trim of the gaming machine on which operating buttons are located;
one or more panels located about the periphery of a top-display box of the gaming machine; and
one or more panels located about the periphery of a bottom-display box of the gaming machine.

In an embodiment, the outer panel has a substantially transparent outer layer.

According to another embodiment, light from the light source is transmitted along the optical pathways and illuminates lighting positions within the housing. For example, the light positions are arranged to illuminate information such as symbols and buttons relating to the gaming being played on the machine. According to another example, light transmitted by the optical pathway may illuminate an image on a translucent film so that the image can be seen by a player.

In an embodiment, the housing includes a light transmitting layer containing images and light transmitted at lighting positions within the housing illuminates the images.

Although it is possible that the optical pathway may be defined by a series of optical pieces including reflective surfaces such a flat, convex or concave mirrors, and lenses preferably, the optical pathway is in the form of a light guide that defines a route having an external boundary within which light is transmitted. For example, the light guide may be in the form of a conduit, tube or optical fibre.

In an embodiment, at least one of the optical pathways is in the form of an optical cable. Moreover, suitably each lighting position is illuminated by light from one or more light sources that is transmitted to each lighting position by one or more optical pathways, suitably in the form of one or more optical cables.

In an embodiment, the optical cable includes a bare fibre single strand and light emitted from an end of the cable can be used to illuminate one or more than one of the lighting positions. Bare fibre single strands are known for transmitting light in a manner such that light radiates from the end face of the cable.

In an embodiment, the bare fibre single strands range from 0.25 to 5.00 mm in diameter, and suitably in the range of 1.0 to 3.0 mm.

In an embodiment, at least one of the bare fibre strand is arranged such that the longitudinal axis of the cable is in a direction transverse, or suitably at right angles to an outer face of one of the outer panels. Even more suitably, at least one of the bare fibre strands is arranged such that the end of the optical cable, from which light can be emitted, is arranged transversely to an outside face of the housing In an embodiment, the optical cable includes a glowing end optical cable having a central light transmitting core and light emitted from an end of the cable can be used to illuminate one or more than one of the lighting position. Glowing end optical cables, also known as "end glow optical cables" are known as having an outer sheath or jacket of non-transparent material and an inner core of light transmitting radiating material, wherein light is able to radiated from the inner core in regions of where the non-transparent material has been removed.

It is possible that the end glow optical cable may be a single strand cable or a multiple strand cable such as cable comprising from 2 to 200 individual strands. Irrespective of whether the cable is a single or multiple strand cable in an embodiment, the central core of the end glow optical cable is in the range of 1.0 to 15.0 nm in diameter and suitably, in the range of 2.0 to 10.0 mm.

In an embodiment, the optical pathway includes a side glow cable and light emitted along the length of the cable can be used to illuminate respective lighting positions having an elongated shape. Side glow cables are known as capable of the radiating light outwardly along the length of the cable, suitably radiating light substantially uniformly along the length of the cable.

In an embodiment, one of the side glow cables extends longitudinally along the outer panel of the housing.

In an embodiment, the side glow cable extends along an edge or corner of one of the outer panels of the housing.

It is possible that the side glow cable may be a single strand cable or a multiple strand cable, such as a cable comprising from 2 to 200 individual strands. Irrespective of whether the cable is a single or multiple strand cable in an embodiment, the cable has an inner core in the range of 3.0 mm to 15.0 mm in diameter.

In an embodiment, the light source is a laser, LED or OLED.

hi an embodiment, different colours are emitted by the light source either simultaneously or disjunctively.

In an embodiment, the light source comprises two or more separate light elements, each element emitting different coloured light and each aligned with optical pathways.

The colour of the light being emitted from the light source may change colour by any means such as switching on and off filaments having different light emitting properties. According to an embodiment, the light source has a plurality of differently coloured light filters, whereby light emitted from the light source is coloured according to the colour of the light filters through which the light passes.

In an embodiment, the light filters are movable such that the colour of the light being transmitted along each respective optical pathway can be changed according to particular of the filter aligned with the light source.

The light filters may be of any colour and, in addition, includes a blank section such that white light is able to be transmitted along the respective pathway to which it is aligned and a non-transparent section preventing light from being transmitted along the respective pathway to which it is aligned.

In an embodiment, the gaming machine further includes a controller for switching the light source on and off. In an embodiment, the controller controls the colour of the light being emitted from the light source.

In an embodiment, the controller moves the filter so to change the position of the light filters and thus the colour of the light being emitted from the light source.

In an embodiment, the controller is in data communication with another controller of at least one other gaming machine, and wherein data relating to the operational status of the gaming machine is communicated to the other controller which determines, at least for a period, illumination of the lighting positions of the other gaming machine.

In an embodiment, the data communicated to the other controller is data relating to illumination of the lighting positions of the gaming machine which in turn determines illumination of the lighting positions of the other gaming machine According to the present invention there is provided a network of gaming machines, the network comprising:

i) a plurality of gaming machines each having a housing for containing at least a portion of working components of the gaming machines, wherein each gaming machine has at least one and suitably a plurality of lighting positions which can be illuminated and which are located at either one or a combination of locations inside or outside the housing;

ii) a light source that emits light; and iii) a plurality of the optical pathways that transmit light from light source to the lighting positions of two or more gaming machines.

In an embodiment, the network further includes a controller that controls illumination of the lighting positions of the gaming machines.

In an embodiment, the controller controls illumination of the lighting positions based on the operational status of one or more of the gaming machines of the network In an embodiment, the network further includes an outcome determiner that determines the outcome of a gaming being played on the machine, wherein outcome determiner is in data communication with the controller and the controller controls illumination of the lighting positions based on the data from the outcome determiner The network may also comprise any one or a combination of the features of the gaming machine described above including specific types of the optical cables.

BRIEF DESCRIPTION OF SEVERAL VIEWS OF THE DRAWINGS

The present invention will now be described in detail with reference to the accompanying drawings, of which.

DETAILED DESCRIPTION OF THE INVENTION

Gaming machines generally fall into one of three categories, namely either purely electronic machines comprising, for example, a touch screen and electronic display; electro-mechanical machines comprising, for example, a combination of mechanical reels and electronic displays; or essentially mechanical machines comprising, for example, mechanical reels, levers and push buttons. The present invention and, indeed, the preferred embodiments shown in the figures and described below may be applied to any form of gaming machine including those mentioned above.

Figure 1:
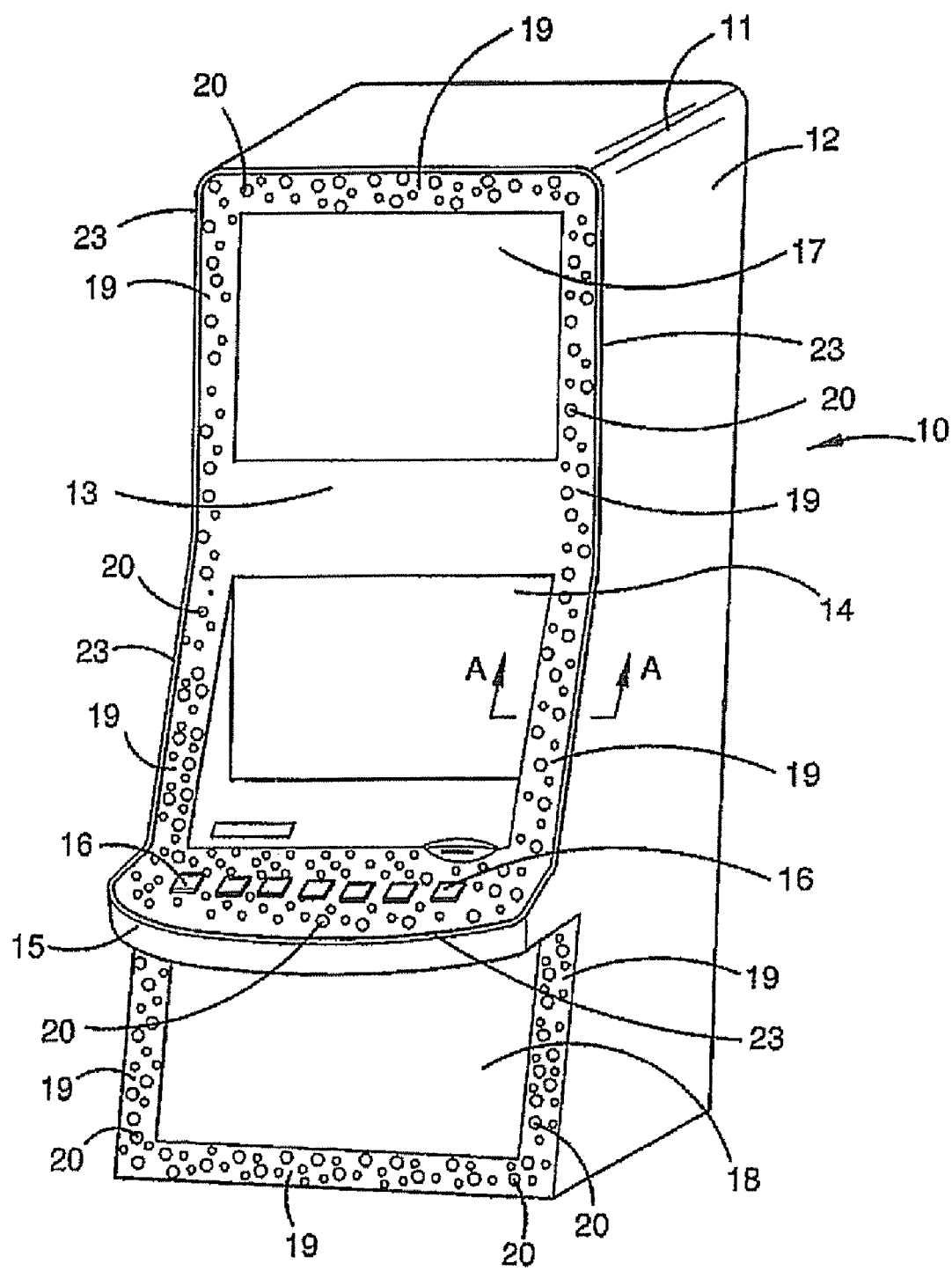
FIG. 1 is a perspective view of the gaming machine according to preferred embodiment comprising a housing having external lighting on perimeter panels of the housing.

An example of a gaming machine according to a preferred embodiment of the present invention is shown in FIG. 1. The gaming machine 10 includes a housing 11 in the form of a cabinet having a rear portion 12 and a front door 13 that opens outwardly. The front door 13 includes a glass face with a viewing window 14 through which an electronic screen or reel can be seen and a mid-trim 15 below the window 14. The mid-trim 15 is an interface comprising a bank of buttons 16 that enables a player to interact with the gaming machine 10. The gaming machine 10 may also include a multitude of other features including a top box 17 carrying artwork such as, play tables and details of bonus awards and other information or images relating to the game being played. The top box 17 may also include an electronic display, for example, a video display unit such as a cathode ray tube screen, a liquid crystal display, a plasma screen or any other suitable video display. Further artwork and/or information may be provided on a bottom region 18 of the cabinet.

As can be seen in FIG. 1 the outer peripheral panels 19 of the bottom region 18, top box 17, viewing window 14, and mid-trim 15 comprise a multitude of small round circles or dots 20. Each dot 20 represents a light emitting end of an optical cable which at an opposite end receives light emitted from a light source.

Figure 2:
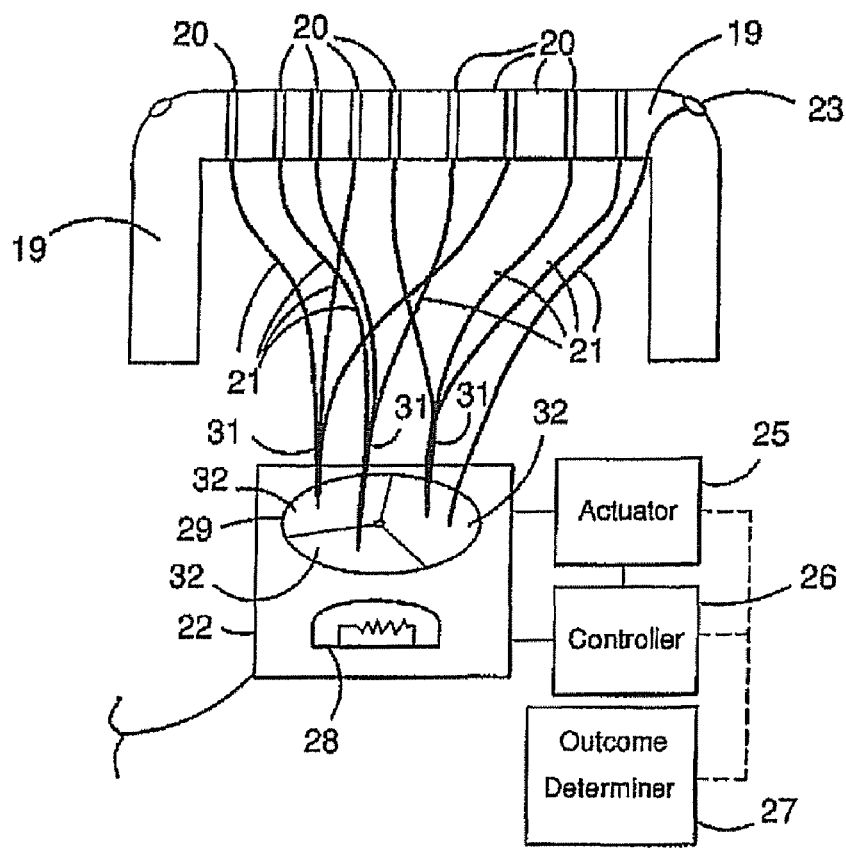
FIG. 2 is a schematic illustration showing a cross-section through the perimeter panel of the housing through the line A-A shown in the FIG. 1, and additional components for transmitting and emitting light from lighting positions on the perimeter panel.

FIG. 2 illustrates a cross-sectional view of an outer perimeter panel 19 of the gaming machine 10 shown in FIG. 1 and an optical system including optical cables 21 that provide lighting to the panels. In particular, a plurality of bare strand optical fibres 21 extend from a light source 22 located within the gaming machine housing to an outer panel 19 around the periphery of the gaming machine 10. The bare single strand fibres 21 extend through the thickness of the panel 19 and terminate at lighting positions 23 represented by the circles and dots 20 shown in FIG. 1. In addition a side glow cable 23, extends longitudinally along the outer edge or perimeter of the gaming machine housing to illuminate a light position that extends at least partially along outer peripheral portions of the housing. Although not shown in the detail in the Figures, it is possible that the optical cables may terminate before the lighting positions, such that light is transmitted to the lighting positions via an alternate medium or air.

Figure 3A:
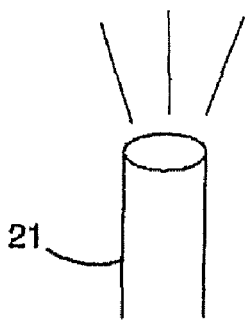
FIG. 3a is a perspective view of an optical cable in the form of a bare fibre single strand that is incorporated in the embodiment shown in FIG. 2.
Figure 3B:
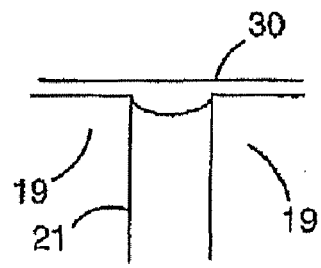
FIGS. 3b to 3d are side views of the bare single fibre strand shown in FIG. 3a, wherein the end of the fibre has a concave formation, a flat formation and a convex formation respectively.
Figure 3C:
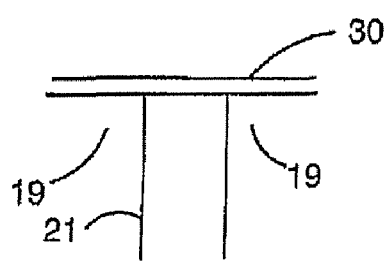
Figure 3D:
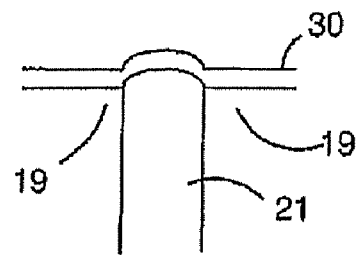

An end view of a bare fibre single strand 21 is illustrated in FIG. 3a. The bare fibre strand 21 is typically made from a glass or fibre glass material and may be of any diameter, suitably a diameter in the range of 0.25 to 5.00 mm. FIGS. 3b to 3d illustrate alternative configurations of the end face of the bare fibre strand 21 in the form of a concave formation, a flat formation and a convex formation respectively. A clear coating material for example, in the form of a lacquer or adhesive film material may be located over the outer face of the gaming machine as represented by layer 30 shown in FIGS. 3b to 3d.

Figure 6:
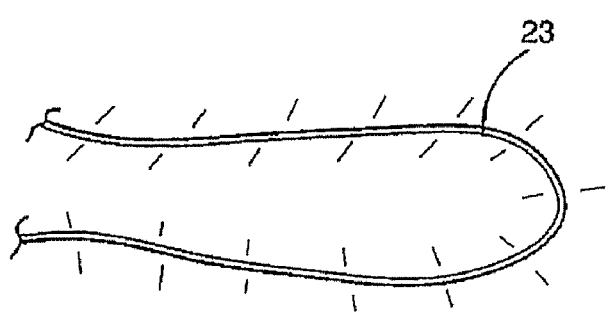
FIG. 6 is a perspective view of an optical cable in the form of a side glow cable which may be incorporated in the embodiments shown in FIGS. 1, 2 and 4.

FIG. 6 is an example of a side glow optical cable 23 whereby light passing into one end of the optical cable is transmitted and evenly radiated along the length of the optical cable. The side glow cable 23 is typically made from a glass or fibre glass material and may have an inner core diameter in range of 3.0 mm to 15.0 mm.

The light source 24 in FIG. 2 emits light that is transmitted by the optical cables 21. FIG. 2 also illustrates an actuator 25 that adjusts the light source 24, a controller 26 that operably controls the light source 22 and an outcome determiner 27. The light source 22 comprises any form of suitable lighting element 28 such as, and by no means limited to, a laser, LED, OLED or a standard incandescent globe. The light source 22 may have a built-in capacity for emitting light of different colours either simultaneously or consecutively. In the case of the embodiment shown in FIG. 2, the light source 22 comprises a single light emitting element 28 and a light filter 29 in the form of a circular disc that is rotated or pivoted about an axis by the actuator 25. The light filter 29 comprises two or more different colour filters 32 and light radiating from the light source and through the filter 29 is able to transmit along each single fibre 21 or each group of fibres 31 to the lighting positions 20 on the panels 19. A controller 26 may be used to switch the lighting element(s) 28 on and off as desired, thereby controlling the intensity and colour of light being transmitted. Furthermore, if desired, the controller 26 operatively controls the actuator 25 and thus the alignment of the different coloured filters 32 to the groups 31 of optical cables 31, 23 and, thereby operatively controlling the colour and possibly intensity of light being emitted from the light positions 20. The controller 26 may also be in communication with the outcome determiner 27 that determines the outcome of the game being played on the gaming machine 10. In this situation, it is possible for the operation of the actuator 25 via the controller 26 and outcome determiner 27 to change the colour of the lighting or intensity of the light radiated from the lighting positions 20 in response to outcomes such as, the allocation of a bonus, credits or awards to a player.

Figure 4:
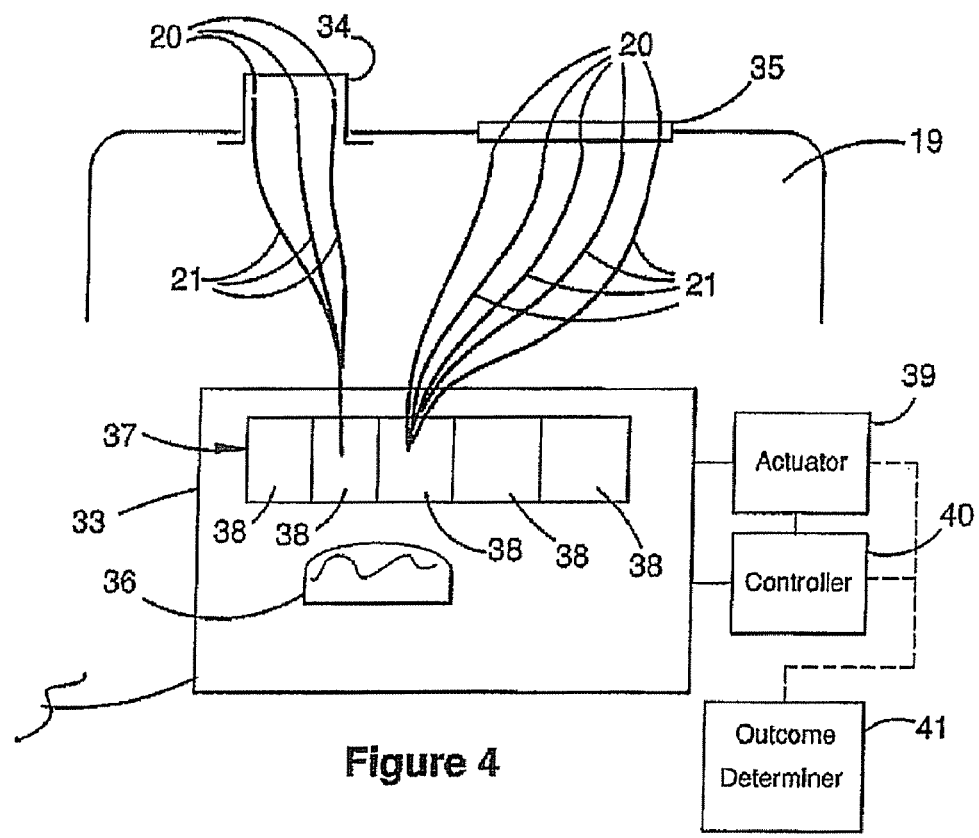
FIG. 4 is a schematic illustration showing a cross-section of a mid-trim of the gaming machine shown in FIG. 1, and additional components for transmitting and emitting light from lighting positions on the mid-trim.

FIG. 2 is an example of a situation which the lighting positions 20 are located on the outside of the gaming machine 10. However, it is within the scope of the present invention that the lighting positions 20 may also be located internally or within the housing 11 of the gaming machine 20 and in some respects facilitate operation of the gaming machine 20 in the sense that the light enables a player to see information or symbols relating to the game being played. FIG. 4 is an example in which lighting positions 20 are illuminated using optical pathways in the form of optical cables 21 extending from a lighting source 33 located within the housing 11 of the gaming machine 10 to lighting positions 20 also located inside the gaming machine 10. In particular, FIG. 4 illustrates lighting positions 20 within the gaming machine that illuminate an operating button 34 that is pressed by a player whilst playing the machine and a translucent screen 35 carrying an image which, depending on the properties of the screen, may be a variable image which is illuminated from within the gaming machine to allow the image to be seen by the player. Similar to the embodiment shown in FIG. 2, the light source 33 in FIG. 4 comprises a lighting element 36 such as a laser, LED, OLED or an incandescent light comprising one or more lighting elements. The lighting elements 36 may themselves radiate white light or any other desired colour of light. However, it is anticipated that the light source 33 will radiate white light and that a light filter 37 comprising a variety of different coloured filters 38 including the options of white light or a totally non-transparent filter may be used to transform the light being radiated from the lighting element to the desired colour. As can be seen, the ends of the optical cables 21 are grouped together to align with particular filters 38 and an actuator 39 moves the filters 38 when desired to change the alignment of the filters 38 to the ends of the optical cables 21 and thus change the colour of light being transmitted along the optical cables 21 and radiated from the lighting positions 20. A controller 40 operatively controls the actuator 39 and the on and off operation of the or each lighting element 36. An outcome determiner 41 determining the outcome of the game being played on the gaming machine 10 may also be in communication with the controller 40 and/or actuator 39 so as to change the colour or intensity of the light being emitted from the lighting positions 20. For example, in the situation in which it is desired to increase the intensity of the light being emitted in the event of a bonus credit or a payout being awarded to a player, the outcome of the game will be communicated to the controller 40 by the outcome determiner 41 and, in turn, the controller 40 may switch on at least one additional lighting element to increase the intensity of light being transmitted along the optical cables 21 and therefore radiated from the light positions. The controller 40 may also be in data communication with a controller of at least one other gaming machine. The type of the data communicated between separate machines may relate to the operational status of each machine including the status of the game and the location of the payouts or awards. For example, illumination of the light positions at a particular intensity and sequence in the event of the winning outcome of one particular machine, such as a winning machine, can spread to other gaming machines. In other words, data relating to the illumination of the lighting positions of one gaming machine can be communication to the other gaming machines so that the lighting positions of the other gaming machines may be the same or different to illumination of the other gaming machines. Data communication between the gaming machines may be achieved by any suitable links and devices including, for example, infrared links, blue tooth links, wireless links, or fixed cable links.

Figure 5:
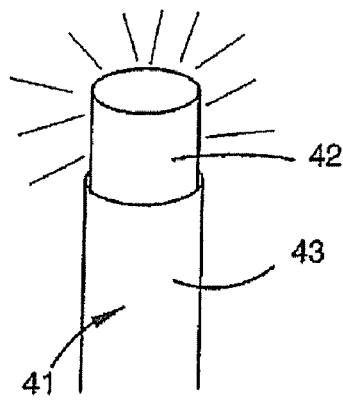
FIG. 5 is a perspective view of an optical cable in the form of an end glow cable which may be incorporated in the embodiments shown in FIGS. 1, 2 and 4.

The optical cables for transmitting light to the lighting positions may be any optical cable including the bare fibre single strands 21 shown in FIG. 3a to 3d. FIG. 5 is a schematic illustration of an optical cable in the form of an end glow optical cable 41 which is characterised by having an inner core 42 of light transmitting material and an outer jacket 43 of non-transparent material. The non-transparent material is removed from an end section of the optical cable to allow light entering the other end of the optical cable to be radiated outwardly from the cable.

The embodiments of the invention depicted in FIGS. 1, 2 and 4 are examples of a gaming machine having a plurality of lighting positions 20 that are illuminated by a single dedicated light source. In other words, it is envisaged that each gaming machine may include a single light source, optical cables for transmitting light from the light source to lighting positions, and additional components including actuators and controllers from controlling the colour and intensity of light radiated from the lighting positions.

Figure 7:
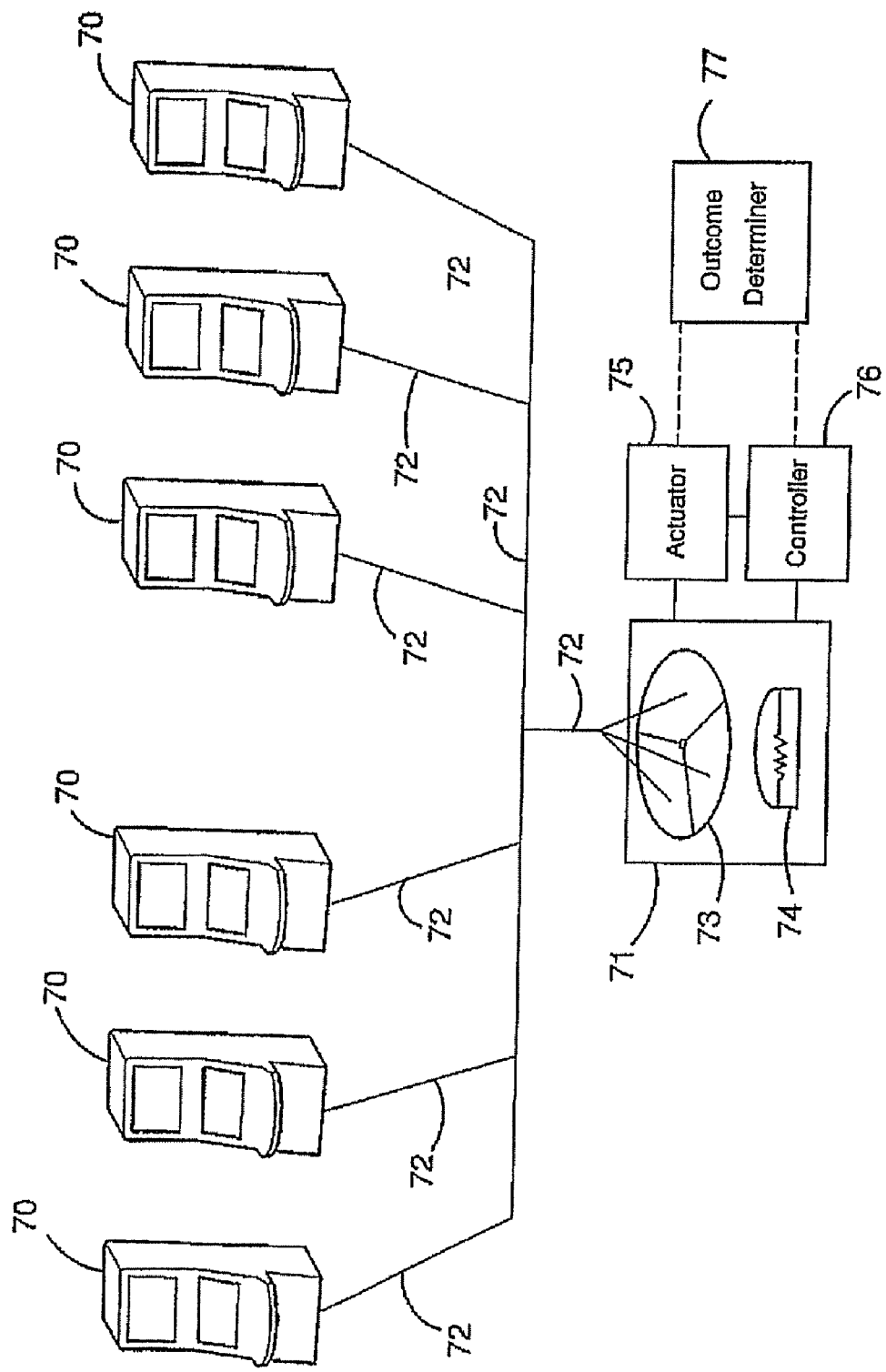
FIG. 7 is a schematic illustration of an alternative embodiment including a series of gaming machines that are connected to a single common light source that provide lighting for the gaming machines.

FIG. 7 is an example of an alternative embodiment of the present invention in which multiple gaming machines and, in particular 6 gaming machines 70, are connected to a single common light source 71 by way of optical cables 72. Each gaming machine comprises a housing as shown in FIG. 1 in which at least one lighting position 20 and, suitably, a plurality of lighting positions 20 in at least one of the inside or outside of the housing require lighting. Each lighting position 20 is illuminated by way of one or more optical cables 72 such as a bare fibre single strand, end glow cable or a side glow cable illustrated in FIGS. 3a to 3d, FIG. 5 and FIG. 6. The cables 21 may be grouped together in any sequence and exposed to a particular colour light from the light source 71. For example, the optical cables 21 from lighting positions of the same locations on each of the gaming machines 70 may be grouped together such that light emitted from the gaming machines will have the same lighting pattern. Similarly, it is possible for the groupings of cables to be random or specifically selected so that the colour of light at the same lighting positions is different on two or more of the gaming machines 70. In any event, the optical cables are aligned with light filters 73 that transform light from a lighting element 74 into a desired colour. The lighting element 74 may be in the form of any suitable element including a laser, LED, OLED or an incandescent light. The filter 73 is in the form of a round rotatable filter which can be rotated to change the alignment of the filter 73 with each group of cables and thus change the colour of the light be transmitted along each group of cables 72 and the colour radiated from the lighting positions 20. An actuator 75 moves the filter 73 as desired and is operatively controlled by a controller 76 which may also switch the lighting element 74 between on and off positions. If desired, more than one lighting element 74 may be provided whereby the intensity of the light passing through the filter 73, transmitted along the cables 73 and ultimately radiated from the lighting positions 20 may be changed by the controller 76 switching one or more of the lighting elements 74 on and off. In addition, an outcome determiner 77 determining the outcome of one or more of the gaming machines 10 is connected to the common lighting source 71. The lighting source may communicate with the controller 76 and/or actuator 75 such that in the event of a particular outcome occurring to one the gaming machines, such as a jackpot or payout being won by a player, the colour and intensity of light being emitted may be changed as desired.

The controller 76 may also be in data communication with an interactive component of the gaming machine such as: an audio visual device; the outcome determiner 77 which, for example, determines the allocation of bonuses, payouts, outcomes of a game, the appearance of symbols, the number of wild symbols or the contribution of the gaming machine to a jackpot; or a reel controller which for example may control the stop position or spin rate of the reels. In response to data communicated to the controller 76, the controller 76 may adjust the lighting at the lighting positions such that in the event of the payout or award occurring at one of the games, for example a winning gaming machine, the illumination of the lighting positions of the winning gaming machine may be different to the illumination of the lighting of the other machines of the network. Alternatively, the illumination of the light positions of one or more of the machines neighbouring the winning machine may be adjusted to illuminate lighting positions in a particular pattern or sequence that is the same or similar to illumination of the lighting positions of the winning gaming machine.

Although not shown in FIG. 7, the optical cables may be coupled together to form a cable network using any suitable form of the coupler or connector. The light source may also be located in the housing of one of the gaming machines or remotely located from the gaming machines.

Those skilled in the art of the present invention will appreciate that many modifications and variations may be made to the embodiments of the invention described above without departing from the spirit and scope of the present invention.

For example, the gaming machines may also include any other form of lighting including individual LED's, florescent lighting means and electronic displays to facilitate operation of the gaming machine and provide an aesthetically pleasing machine.

According to another example, it is within the scope of the present invention that the network of gaming machines may comprise 2 or more gaming machines that are connected to a common lighting source. The gaming machines may be connected to a single common lighting source or a plurality of lighting sources.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming machine arranged to provide a game having outcomes determined by an outcome determiner, comprising:
   a housing for containing at least a portion of working components of the gaming machine;
   a light source that emits light;
   an optical pathway in the form of an optical cable that transmits light from the light source to a lighting position so as to provide illumination at the lighting position, the lighting position being located inside or outside the housing, wherein the optical cable includes a side glow cable and light emitted along the length of the cable can be used to illuminate respective lighting positions having an elongated shape; and
   a controller operable to control the light source, the controller being in communication with the outcome determiner of the gaming machine such that the controller is operable to change the light emitted from the light source in response to outcomes of the game.

2. The gaming machine according to claim 1, wherein the lighting position is one of a plurality of lighting positions of which one or more than one may be located either inside or outside the housing, and each lighting position is illuminated by light transmitted from the light source by at least one optical pathway.

3. The gaming machine according to claim 1, wherein the housing includes an outer panel, the lighting position is on the outer panel, and the optical pathway is arranged to transmit light from the light source to the lighting position.

4. The gaming machine according to claim 3, wherein light emitted from the lighting position on the outer panels radiates away from the outer panel.

5. The gaming machine according to claim 3, wherein the outer panel is in the form of a panel located about the periphery of a display.

6. The gaming machine according to claim 3, wherein the outer panel is in the form of an upper face of a mid-trim of the gaming machine on which operating buttons are located.

7. The gaming machine according to claim 3, wherein the outer panel is in the form of one or more panels located about the periphery of a top-display box of the gaming machine.

8. The gaming machine according to claim 2, wherein light emitted from the light source is transmitted along the optical pathways and illuminates lighting positions within the housing.

9. The gaming machine according to claim 1, wherein the optical pathway is in the form of a light guide that defines a route having an external boundary within which light is transmitted.

10. The gaming machine according to claim 1, wherein the optical cable includes a bare fibre single strand and light emitted from an end of the cable can be used to illuminate one or more than one of the lighting positions.

11. The gaming machine according to claim 10, wherein the bare fibre single strand has a diameter ranging from 1.0 to 3.0 mm.

12. The gaming machine according to claim 10, wherein at least one of the bare fibre strands is arranged such that the end of the optical cable from which light can be emitted is arranged transversely to an outside face of the housing.

13. The gaming machine according to claim 1, wherein the optical cable includes a glowing end optical cable having a central light transmitting core and light emitted from an end of the cable can be used to illuminate one or more than one of the lighting positions.

14. The gaming machine according to claim 13, wherein the central core of the end glow optical cable has a diameter ranging from 1.0 to 15.0 mm.

15. The gaming machine according to claim 1, wherein one of the side glow cables extends longitudinally along an outer portion of the housing.

16. The gaming machine according to claim 15, wherein the optical cable has an inner core having a diameter in the range of 3.0 to 15.0 mm.

17. The gaming machine according to claim 1, wherein the light source is a laser, LED or OLED.

18. The gaming machine according to claim 1, wherein different colours are emitted by the light source either simultaneously or disjunctively.

19. The gaming machine according to claim 1, wherein the light source comprises two or more separate light elements, each element emitting a different coloured light and each aligned with respective optical pathways.

20. The gaming machine according to claim 1, wherein the light source has a plurality of differently coloured light filters, whereby light emitted from the light source is coloured according to the colour of the light filters through which the light passes.

21. The gaming machine according to claim 20, wherein the light filters are movable such that the colour of the light being transmitted along each respective optical pathway can be changed according to the colour of light filter operable with the respective optical pathway.

22. The gaming machine according to claim 20, wherein the light filters include a coloured filter of any colour and, in addition, includes a blank section such that white light is able to be transmitted along the respective optical pathway and a non-transparent section preventing light from being transmitted along the respective optical pathway.

23. The gaming machine according to claim 1, wherein the controller switches the light source on and off.

24. The gaming machine according to claim 23, wherein the controller controls the colour of the light being emitted from the light source.

25. The gaming machine according to claim 21, wherein the controller controls movement of the filter so to change the position of the light filters and thus the colour of the light being emitted from the light source and in turn the colour of light illuminating the respective lighting positions.

26. The gaming machine according to claim 23, wherein the controller is in data communication with another controller of at least one other gaming machine, and wherein data relating to the operational status of the gaming machine is communicated to the other controller which determines, at least for a period, illumination of the lighting positions of the other gaming machine.

27. The gaming machine according to claim 26, wherein the data communicated to the other controller is data relating to illumination of the lighting positions of the gaming machine which in turn determines illumination of the lighting positions of the other gaming machine.

28. A network of gaming machines arranged to provide games determined by an outcome determiner, the network comprising:

a plurality of gaming machines each having a housing for containing at least a portion of working components of the gaming machines, wherein each gaming machine has at least one lighting position located either inside or outside the housing, wherein the at least one lighting position is configured to present illumination that is visible from a vantage point external to the gaming machine;

a light source that emits light;

a plurality of optical pathways that transmit light from the light source to one of the lighting positions of two or more gaming machines; and a controller operable to control the light source, the controller being in communication with the outcome determiner such that the controller is operable to change the light emitted from the light source in response to outcomes of the games.

29. The network according to claim 28, wherein the controller controls illumination of the lighting positions of the gaming machines.

30. The network according to claim 29, wherein the controller controls illumination of the lighting positions based on the operational status of one or more of the gaming machines of the network.

31. The network according to claim 29, the outcome determiner determines the outcome of a game being played on a gaming machine from the plurality of gaming machines, wherein the outcome determiner is in data communication with the controller and the controller controls illumination of the lighting positions based on data from the outcome determiner.

* * * * *